United States Patent
Jalpa Taylor et al.

(10) Patent No.: US 10,220,893 B2
(45) Date of Patent: Mar. 5, 2019

(54) SPARE TIRE RELEASE DEVICE WITH DUAL SLIDER MECHANISM

(71) Applicant: FORD GLOBAL TECHNOLOGIES, LLC, Dearborn, MI (US)

(72) Inventors: Jonathan Kaleb Jalpa Taylor, Azcapotzalco (MX); Mark Vargas Morelli Luna, Delegacion Xochimilco (MX); Adrian Gonzalez Romero, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/138,964

(22) Filed: Apr. 26, 2016

(65) Prior Publication Data

US 2017/0305480 A1    Oct. 26, 2017

(51) Int. Cl.
*B62D 43/04*    (2006.01)

(52) U.S. Cl.
CPC .................... *B62D 43/04* (2013.01)

(58) Field of Classification Search
CPC ........ B62D 43/00; B62D 43/02; B62D 43/04; B62D 43/045; B62D 43/002
USPC ........... 224/42.12, 42.13, 42.14, 42.2, 42.21, 224/42.23; 414/463, 462
See application file for complete search history.

(56) References Cited

U.S. PATENT DOCUMENTS

| | | | | |
|---|---|---|---|---|
| 3,330,431 A | * | 7/1967 | Knecht | B62D 43/04 224/42.21 |
| 3,494,493 A | | 2/1970 | Fowler | |
| 3,648,867 A | * | 3/1972 | Beavers | B62D 43/002 414/465 |
| 4,087,032 A | | 5/1978 | Miller et al. | |
| 4,312,620 A | | 1/1982 | Muschalek, Jr. | |
| 4,772,165 A | * | 9/1988 | Bartkus | B60P 7/15 211/7 |
| 4,948,169 A | * | 8/1990 | Amundson | B60R 9/02 182/88 |
| 5,860,786 A | * | 1/1999 | Aubrecht | B62D 43/002 224/42.21 |
| 5,957,346 A | | 9/1999 | Schambre et al. | |
| 5,993,133 A | | 11/1999 | Murray et al. | |
| 6,053,690 A | * | 4/2000 | Hanson | B62D 43/04 224/42.21 |

FOREIGN PATENT DOCUMENTS

KR    101558481 B1    10/2015

OTHER PUBLICATIONS

English Machine Translation of KR101558481B1.

* cited by examiner

*Primary Examiner* — Scott McNurlen
(74) *Attorney, Agent, or Firm* — Jason Rogers; Vichit Chea; King & Schickli, PLLC

(57) ABSTRACT

A spare tire release device is provided for a motor vehicle. That spare tire release device includes a wheel cradle, a first slider mechanism to displace the wheel cradle in a first direction and a second slider mechanism to displace the wheel cradle in a second direction whereby the wheel cradle may be maneuvered for easy access to a spare tire and wheel held in the cradle.

11 Claims, 18 Drawing Sheets

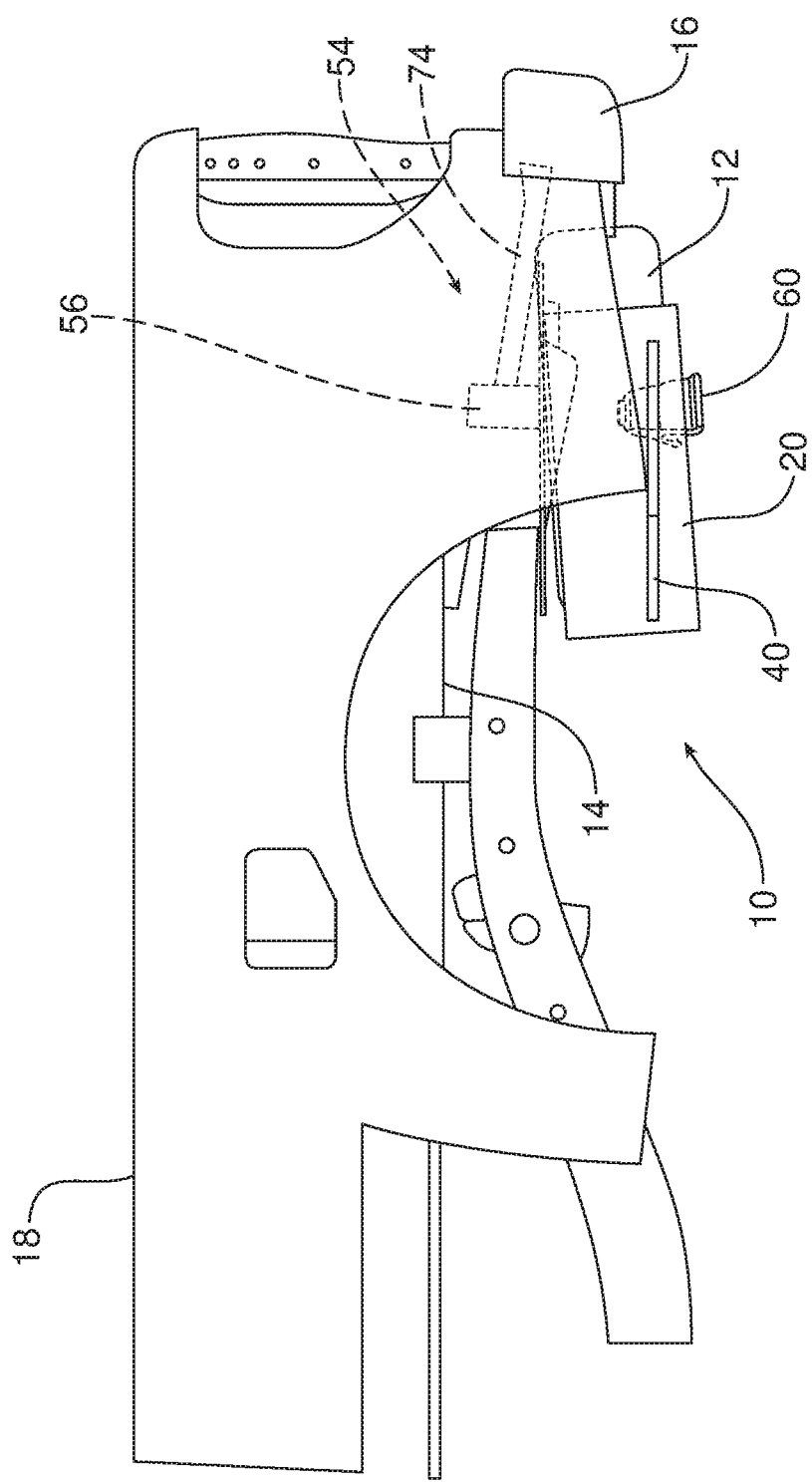

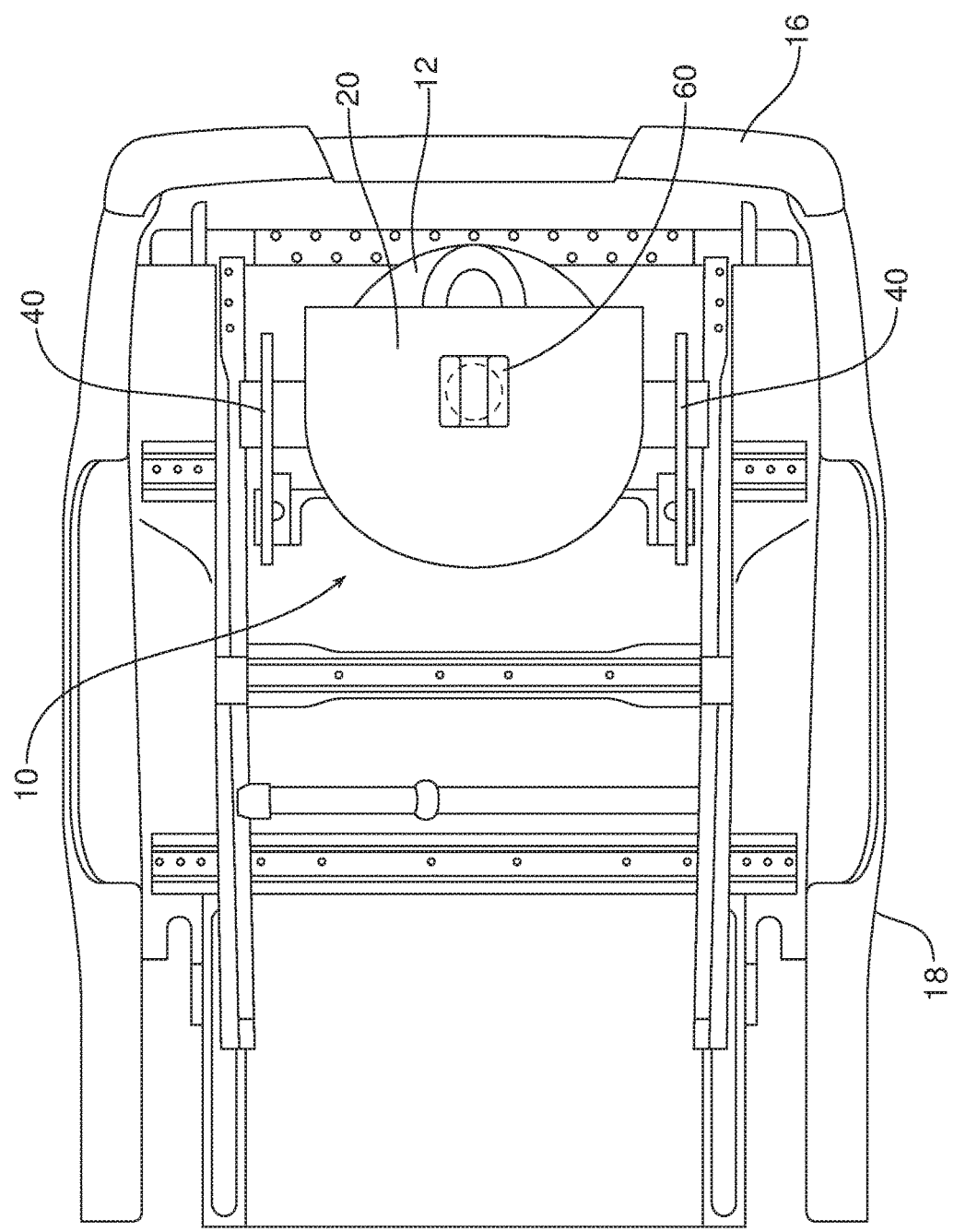

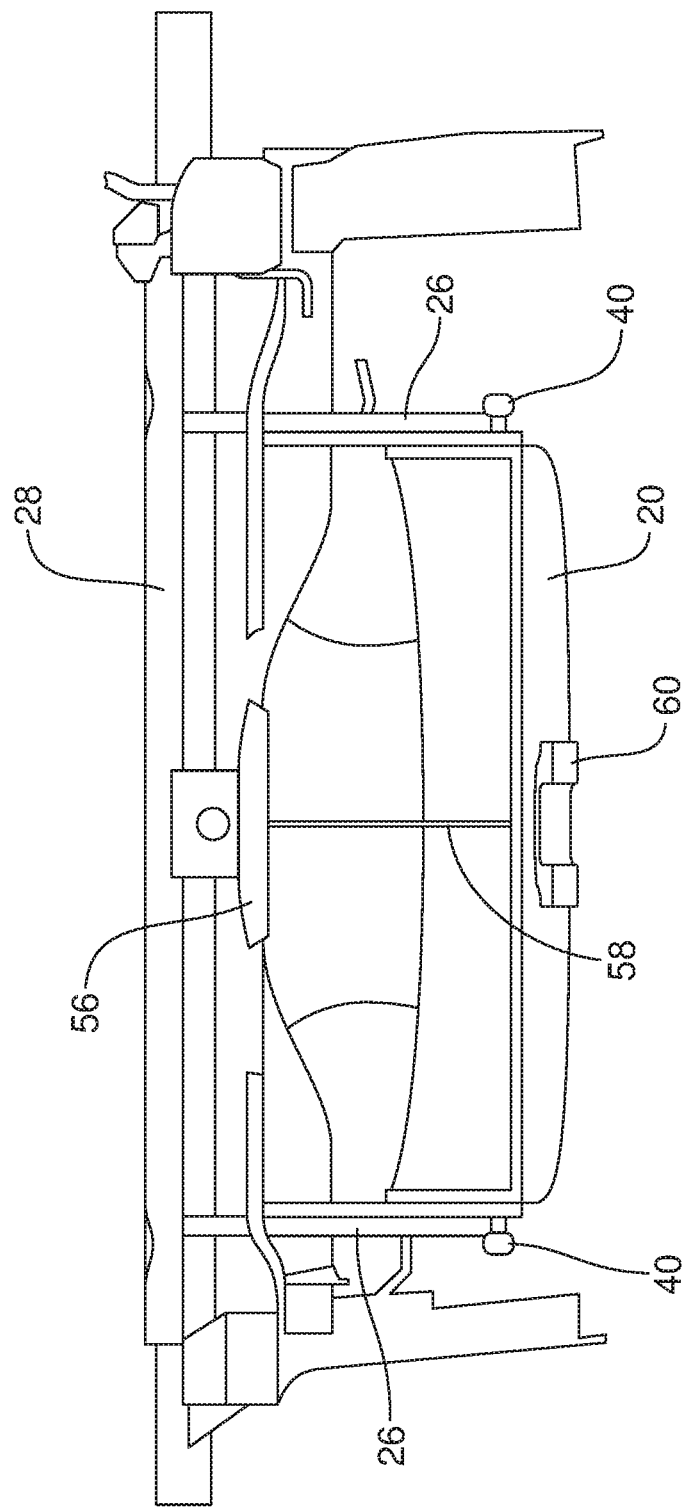

SPARE TIRE RELEASE DEVICE WITH DUAL SLIDER MECHANISM

TECHNICAL FIELD

This document relates generally to the motor vehicle equipment field and, more particularly, to a spare tire release device incorporating a dual slider mechanism that may be used to more easily maneuver a spare tire and wheel out from under a cargo bed and behind a bumper for easy access.

BACKGROUND

In order to conserve cargo capacity in pickup trucks and other vehicles, it is known to stow the spare tire and wheel under the cargo bed behind the rear bumper. While such an approach is effective in maximizing the cargo capacity of the vehicle, it should be appreciated that when needed, the spare tire and wheel is difficult to reach. Further, a spare tire and wheel are relatively heavy and, accordingly, the spare tire and wheel are difficult to maneuver and access, particularly when in an uncomfortable position reaching under the frame of the motor vehicle. In some instances, the process of retrieving the spare tire and wheel in order to change a flat tire may lead to strain and even possible injury.

This document relates to a new and improved spare tire release device and related method that allows one to more easily maneuver the spare tire and wheel for easy access when changing a flat tire or even maintaining the proper air pressure in the spare tire.

SUMMARY

In accordance with the purposes and benefits described herein, a spare tire release device is provided for a motor vehicle. That spare tire release device comprises a wheel cradle, a first slider mechanism to displace the wheel cradle in a first direction and a second slider mechanism to displace the wheel cradle in a second direction whereby the wheel cradle may be maneuvered for easy access to the spare tire and wheel carried on the wheel cradle.

The first slider mechanism may include a first guide fixed to a body of the motor vehicle and a first slide member that slides along the first guide. Similarly, the second slider mechanism may include a second guide fixed to the first slide member and a second slide member fixed to the wheel cradle wherein the second slide member slides along the second guide. In such an embodiment, the first slide member and the second guide comprise a support carriage for the wheel cradle.

The spare tire release device may further include a pulley mechanism, for displacing the wheel cradle in the first direction between a stowed position and a partially deployed position. That pulley mechanism may include a pulley carried on the body of the motor vehicle and a line wound on the pulley. A hanger may be attached to the distal end of the line. The wheel cradle may be supported by the hanger.

In at least one possible embodiment, the first guide and the first slide member are telescoping. In at least one possible embodiment, the second guide and the second slide member are telescoping.

In at least one possible embodiment, the first guide includes a first stop and the first slide member includes a first channel closed at a first end. The first end engages the first stop when the wheel cradle is in the partially deployed position. The second guide may include a second stop and the second slide member may include a second channel closed at a second end. The second end engages the second stop when the wheel cradle is in the fully deployed position. A handle may be provided on the wheel cradle and this handle may be conveniently reached and engaged to displace the wheel cradle between the partially deployed position and the fully deployed position.

The spare tire release device may be utilized in a method of moving a spare tire around a bumper of the motor vehicle. That method may be described as comprising the steps of: (a) lowering a wheel cradle from a stowed position behind the bumper to a partially deployed position lower than the bumper and (b) displacing the wheel cradle rearwardly so that at least a portion of the wheel cradle is directly below the bumper.

Further, the method may include the step of displacing the wheel cradle rearwardly until at least a portion of the wheel cradle projects rearwardly beyond the bumper so as to be easy to access.

In addition, the method may include the step of removing a spare tire from the wheel cradle. Still further, the method may include the step of using a first slider mechanism oriented in a first direction when lowering the wheel cradle. Further, the method may include the step of using a second slider mechanism oriented in a second direction when displacing the wheel cradle rearwardly.

Finally, a motor vehicle is provided incorporating the spare tire release device set forth in this document.

In the following description, there are shown and described several preferred embodiments of the spare tire release device. As it should be realized, the spare tire release device is capable of other, different embodiments and its several details are capable of modification in various, obvious aspects all without departing from the spare tire release device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spare tire release mechanism and together with the description serve to explain certain principles thereof. In the drawing figures:

FIG. 1 is a side elevational view of a motor vehicle incorporating the spare tire release device which is illustrated in the stowed position under the cargo bed behind the rear bumper

FIG. 1b is a bottom plan view of the pickup truck showing the spare tire release device in the stowed position.

FIG. 5a is a detailed rear plan view of the spare tire release device in the stowed position showing the mounting of the first guide of the slider mechanism to the cross car beam of the body/frame of the motor vehicle.

Figure 6:
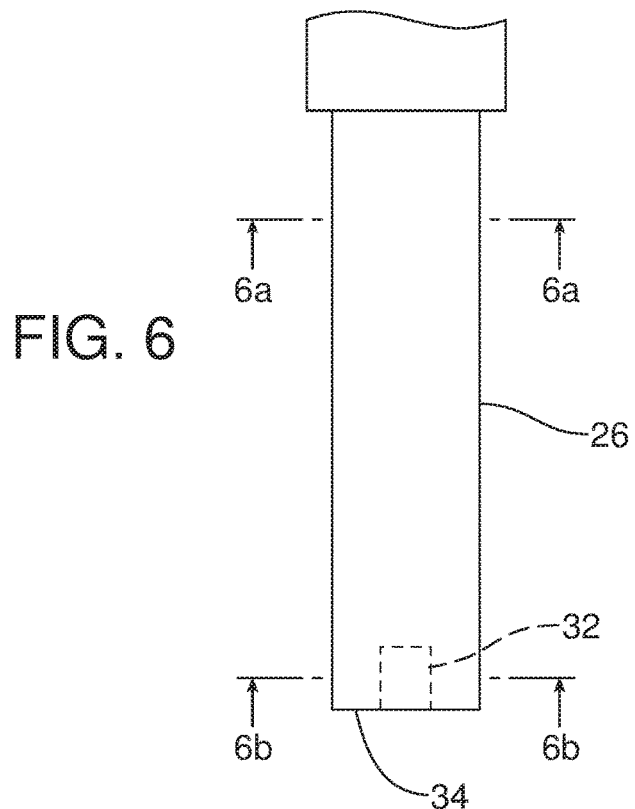
FIG. 6 is a detailed side elevational view of the first guide of the first slider mechanism.
Figure 6A:
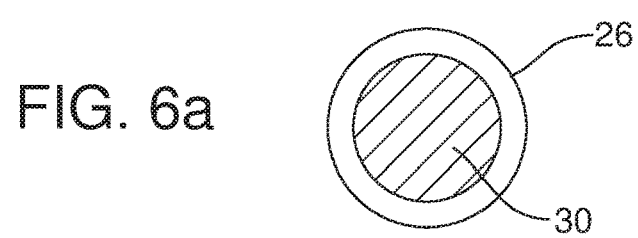
Figure 6B:
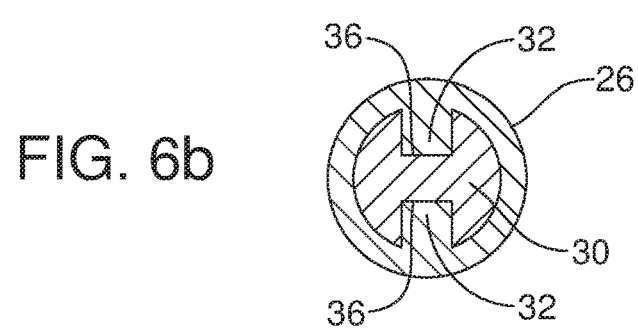

FIGS. 6a and 6b are cross-sectional views of the first guide taken along lines 6a-6a and 6b-6b shown in FIG. 6.

Figure 7:
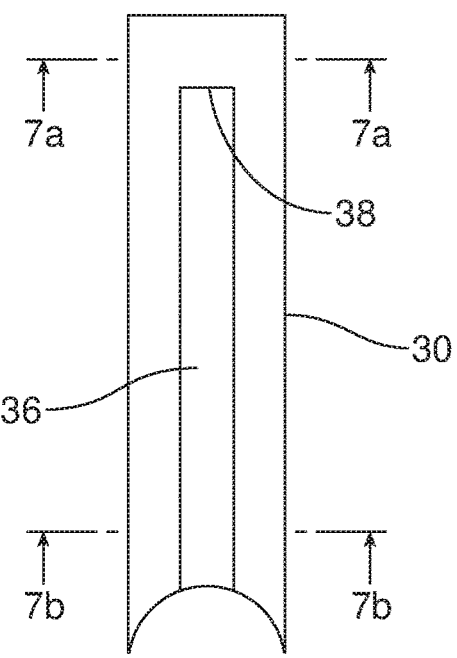

FIG. 7 is a side elevational view of the first slide member that is received in and telescopes with the first guide illustrated in FIG. 6.

Figure 7A:
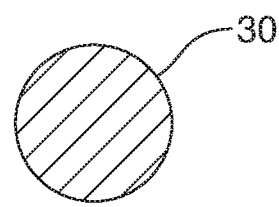
Figure 7B:
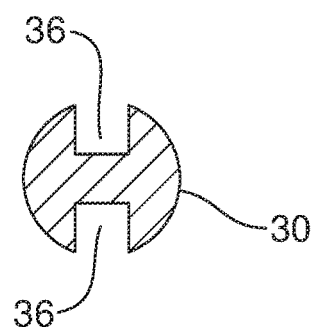

FIGS. 7a and 7b are respective cross-sectional views of the first slide taken along lines 7a-7a and 7b-7b of FIG. 7.

Figure 8:
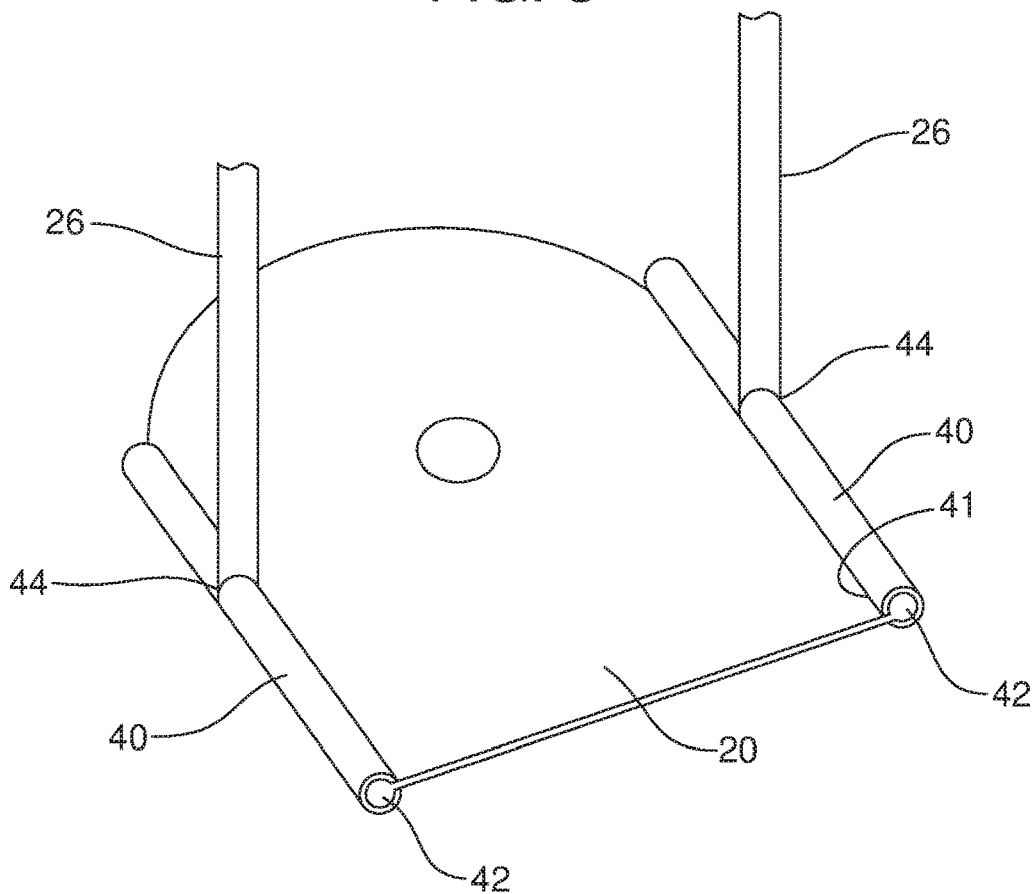

FIG. 8 is a detailed perspective view of the first and second slide mechanisms and the wheel cradle supported therebetween.

Figure 8A:
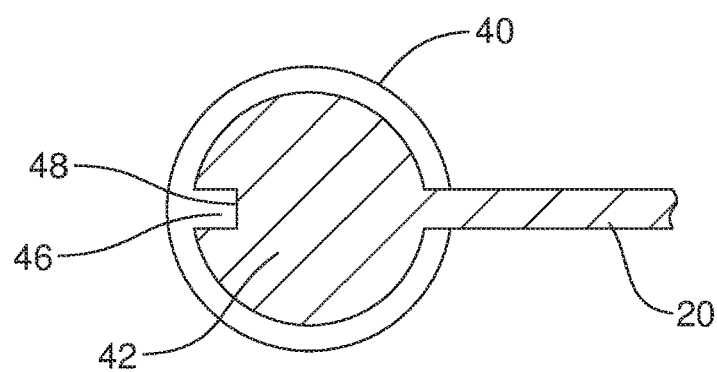

FIG. 8a is a cross-sectional view of the assembled second slider mechanism.

Figure 9:
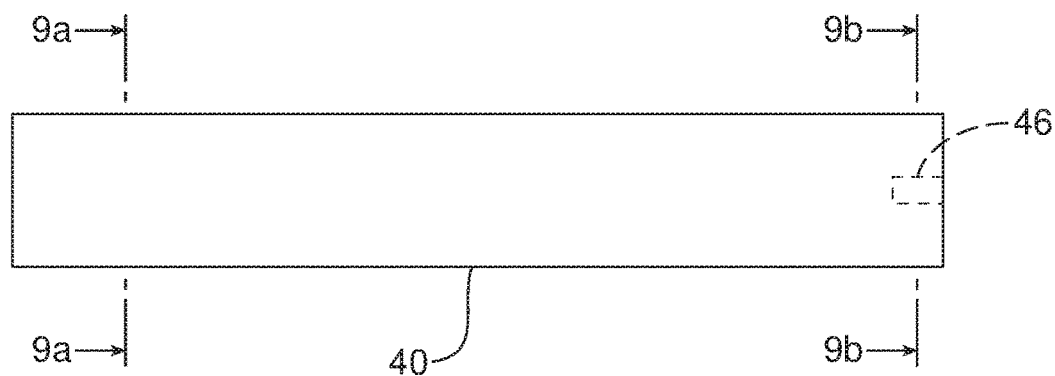

FIG. 9 is a side elevational view of the second guide of the second slider mechanism.

Figure 9A:
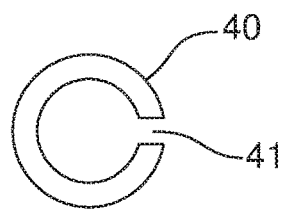
Figure 9B:
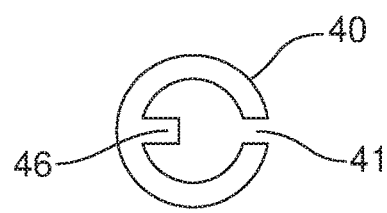

FIGS. 9a and 9b are respective cross-sectional views of the second guide taken along lines 9a-9a and 9b-9b of FIG. 9.

Figure 10:
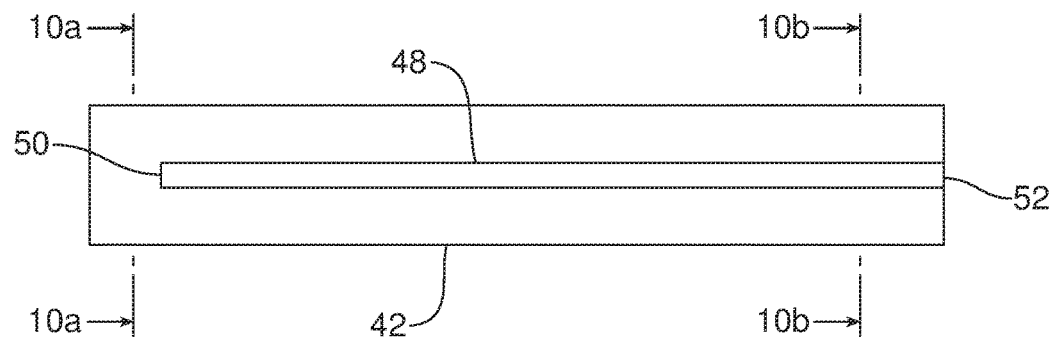

FIG. 10 is a side elevational view of the second slide member of the second slider mechanism.

Figure 10A:
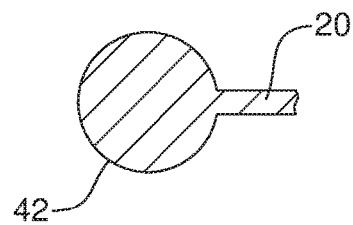
Figure 10B:
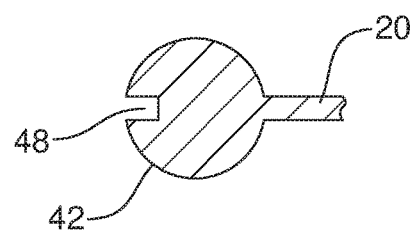

FIGS. 10a and 10b are respective cross-sectional views of the second slide member taken along lines 10a-10a and 10b-10b of FIG. 10.

Reference will now be made in detail to the present preferred embodiments of the spare tire release device, examples of which are illustrated in the accompanying drawing figures.

DETAILED DESCRIPTION

Figure 1A:
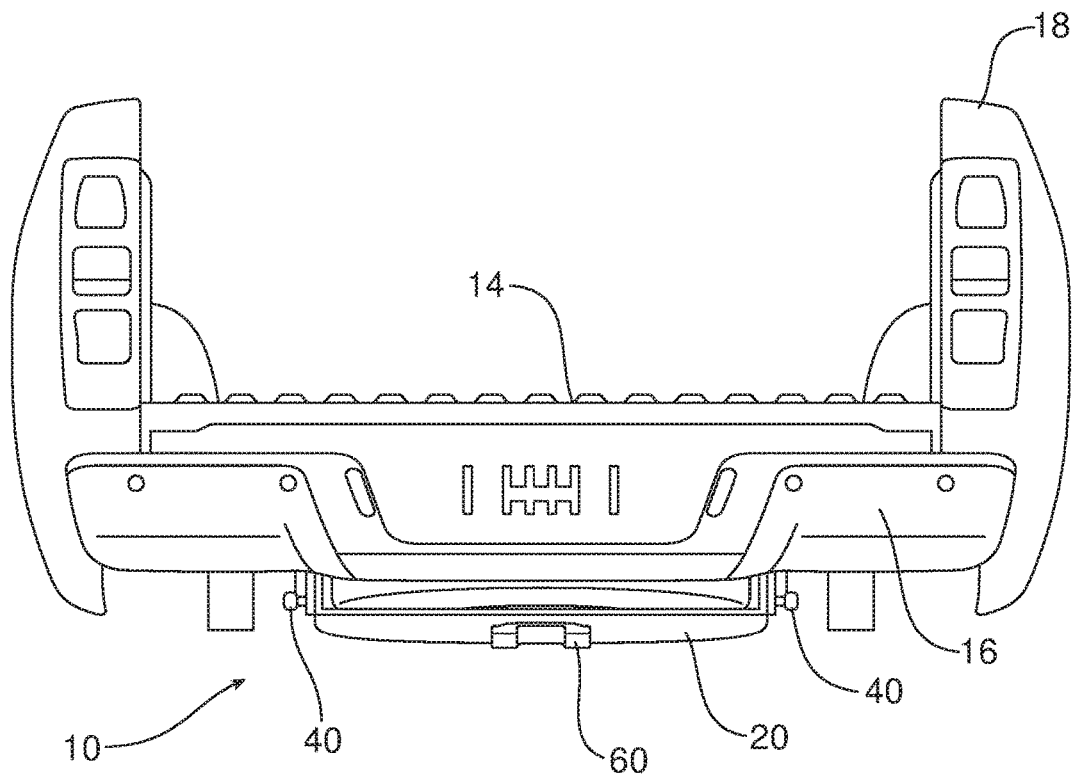
FIG. 1a is a rear elevational view of the pickup truck showing the spare tire release device in the stowed position.
Figure 2:
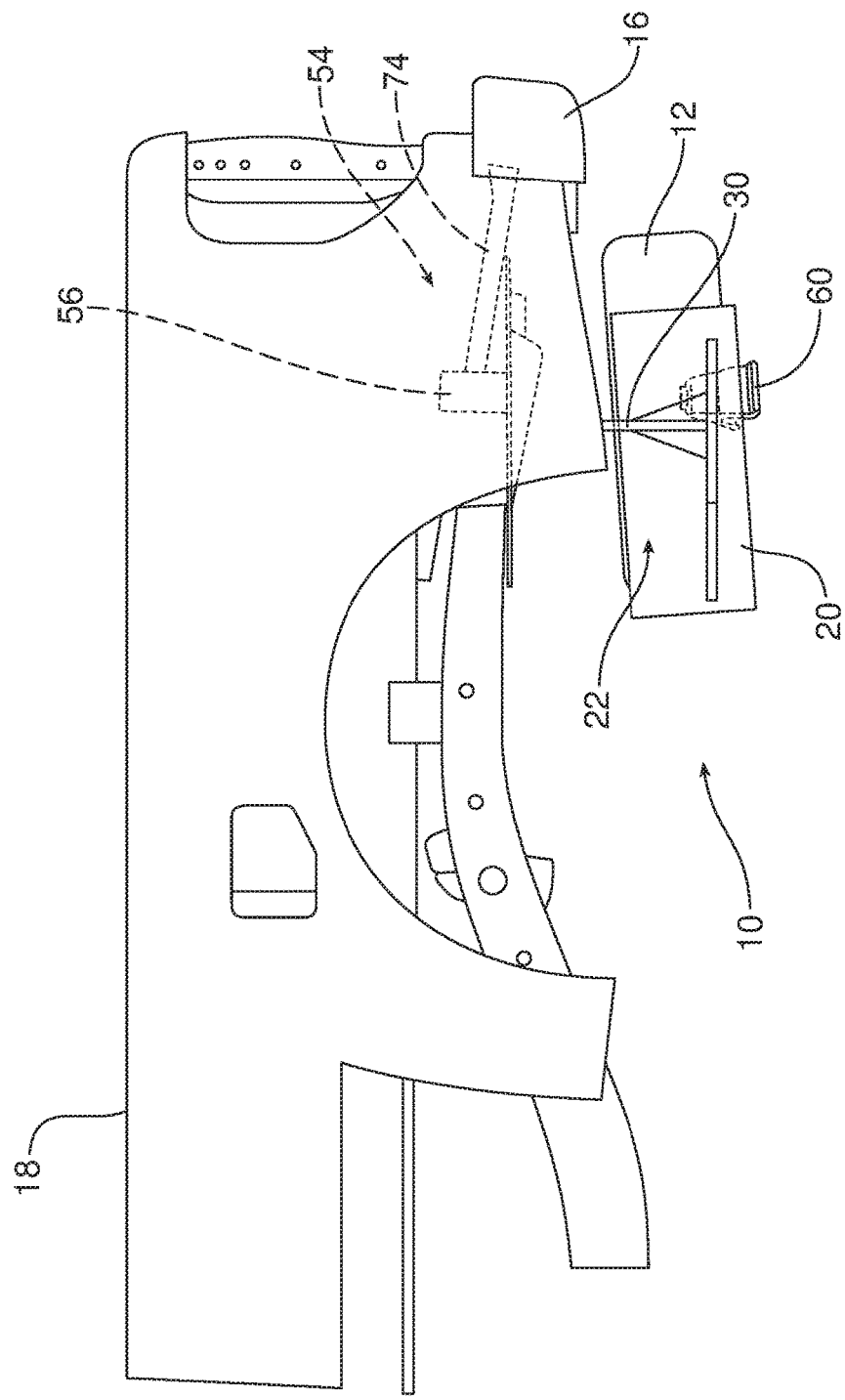
FIG. 2 is a view similar to FIG. 1 but illustrating the spare tire release device in the lowered, partially deployed position.
Figure 2A:
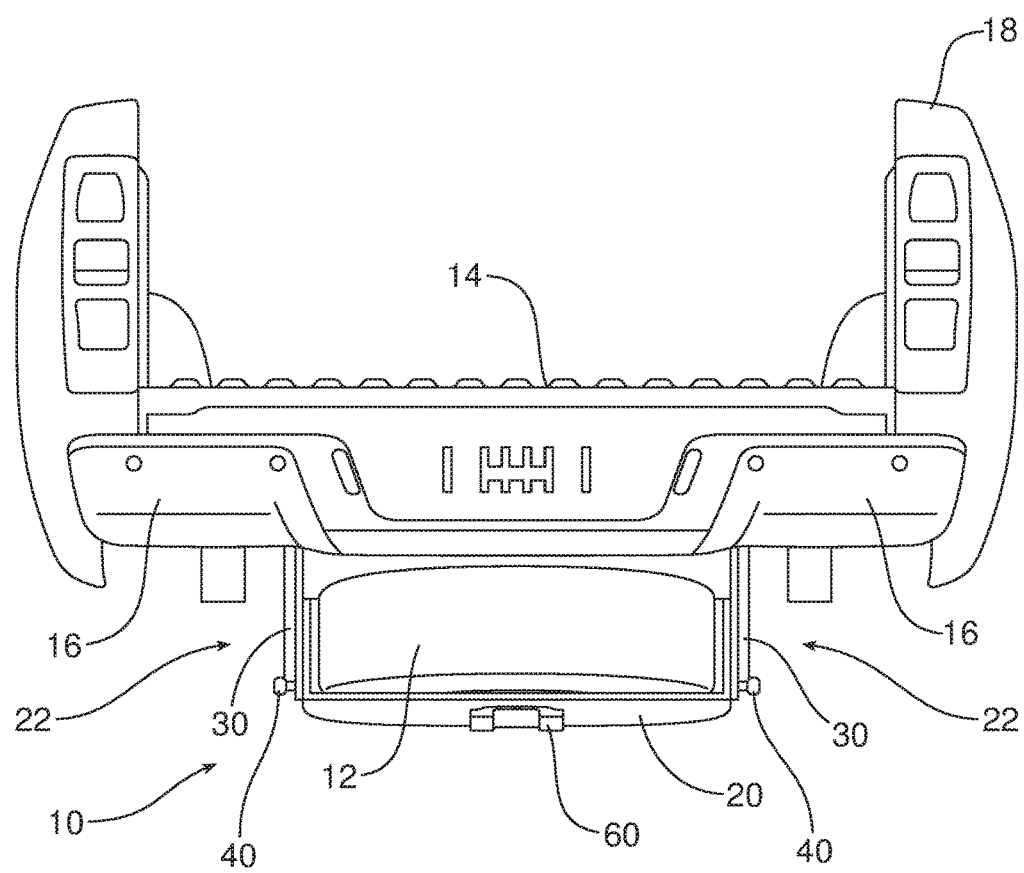
FIGS. 2a and 2b are respective rear elevational and bottom plan views also illustrating the spare tire release device in the partially deployed position.
Figure 2B:
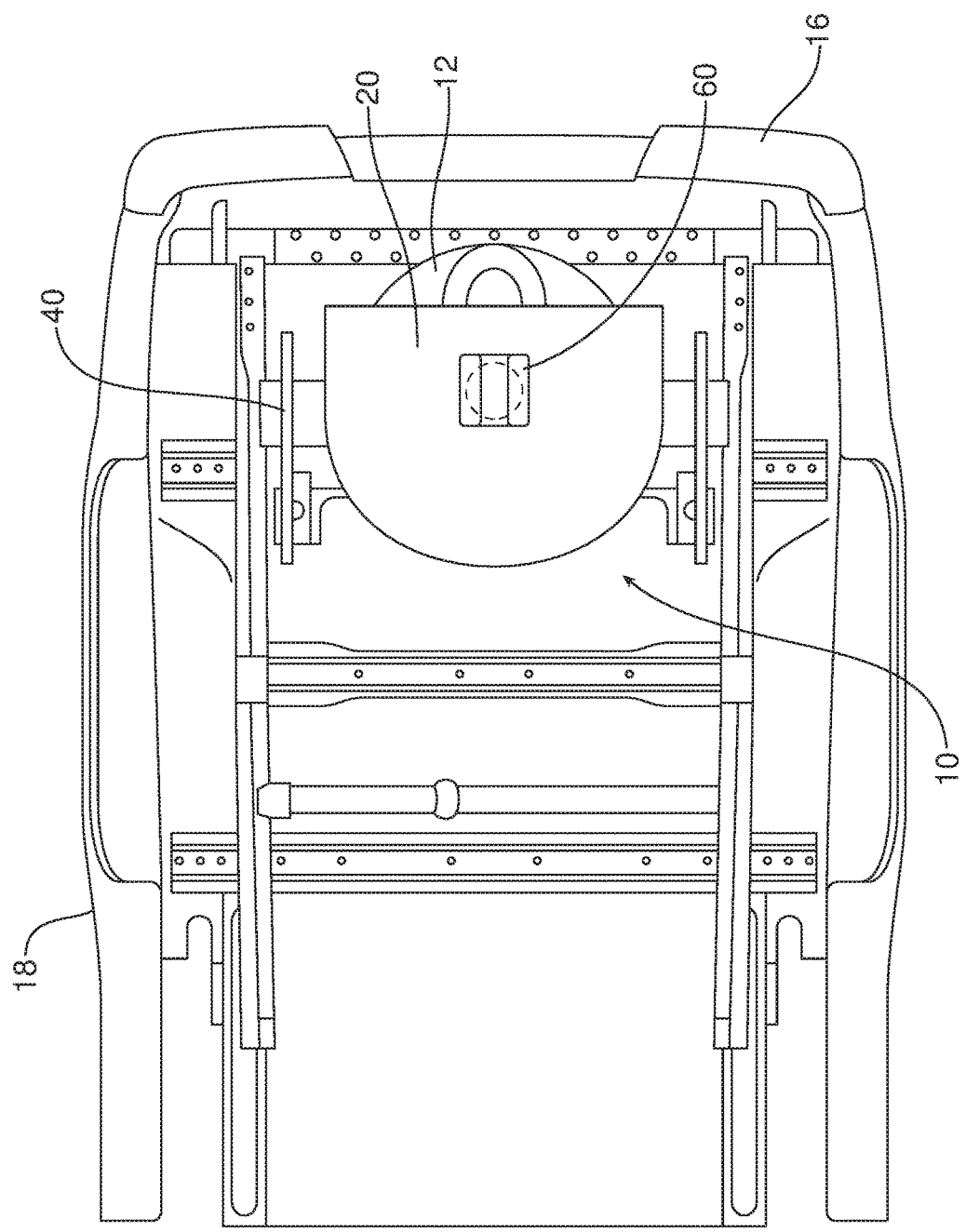
Figure 3:
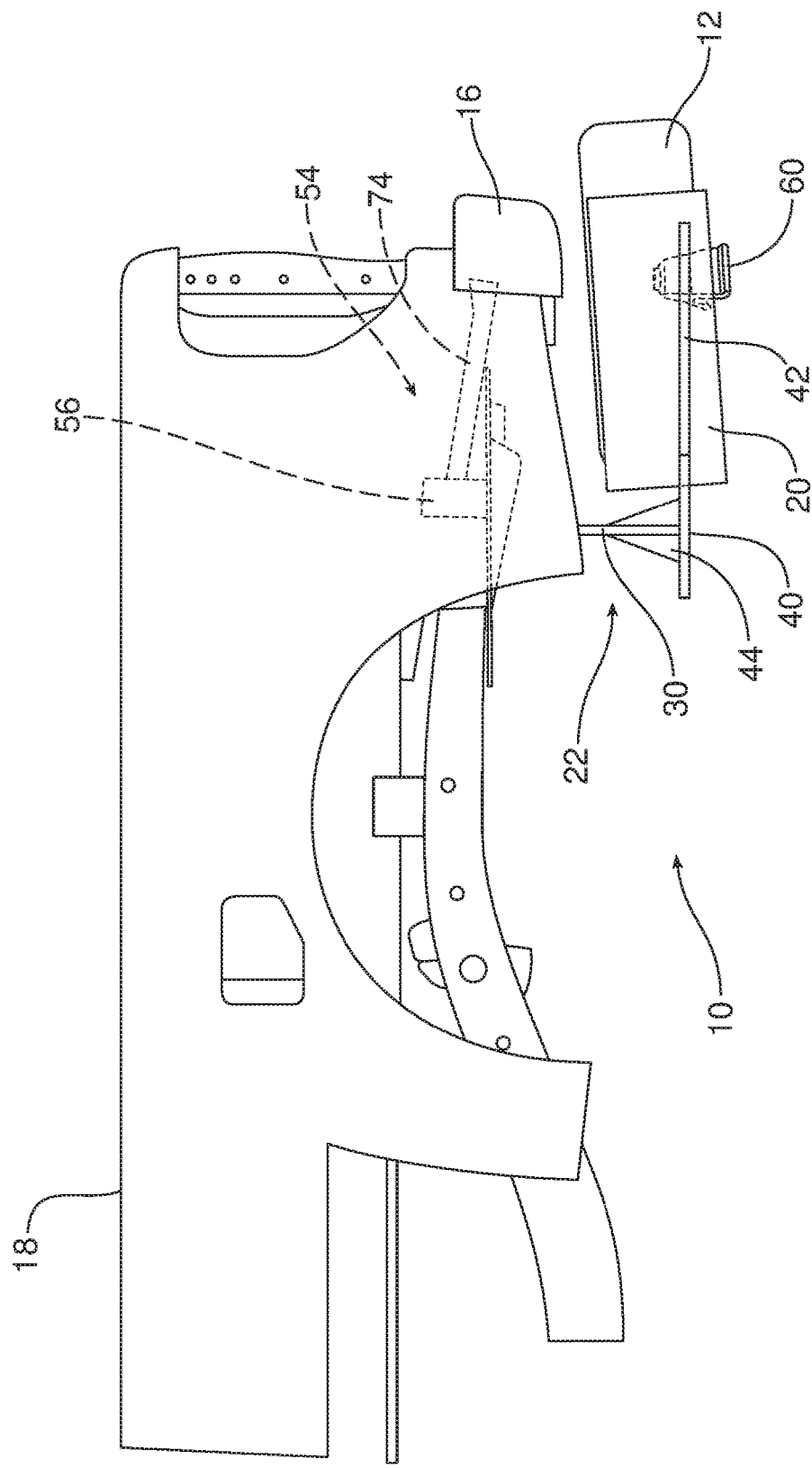
FIG. 3 is a view similar to FIGS. 1 and 2 but illustrating the spare tire release device in the fully deployed position wherein the spare tire and wheel held in the wheel cradle extends rearward of the rear bumper.
Figure 3A:
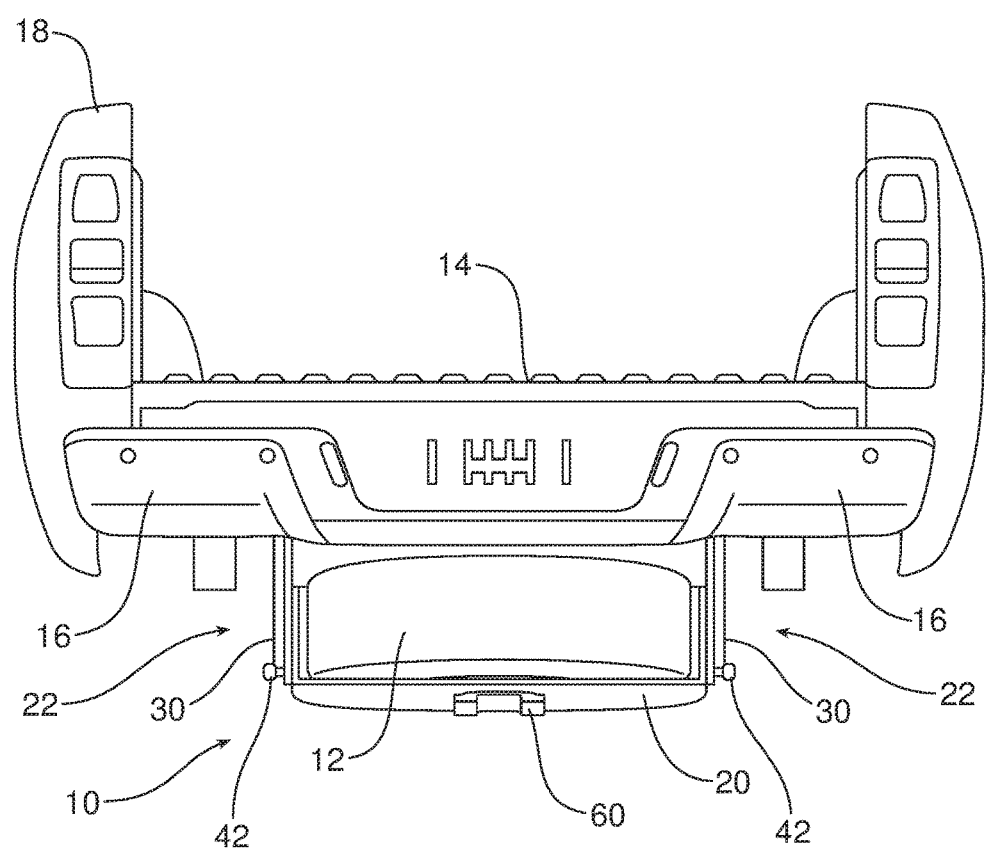
FIGS. 3a and 3b are respective rear elevational and bottom plan views illustrating the spare tire release device in the fully deployed position.
Figure 3B:
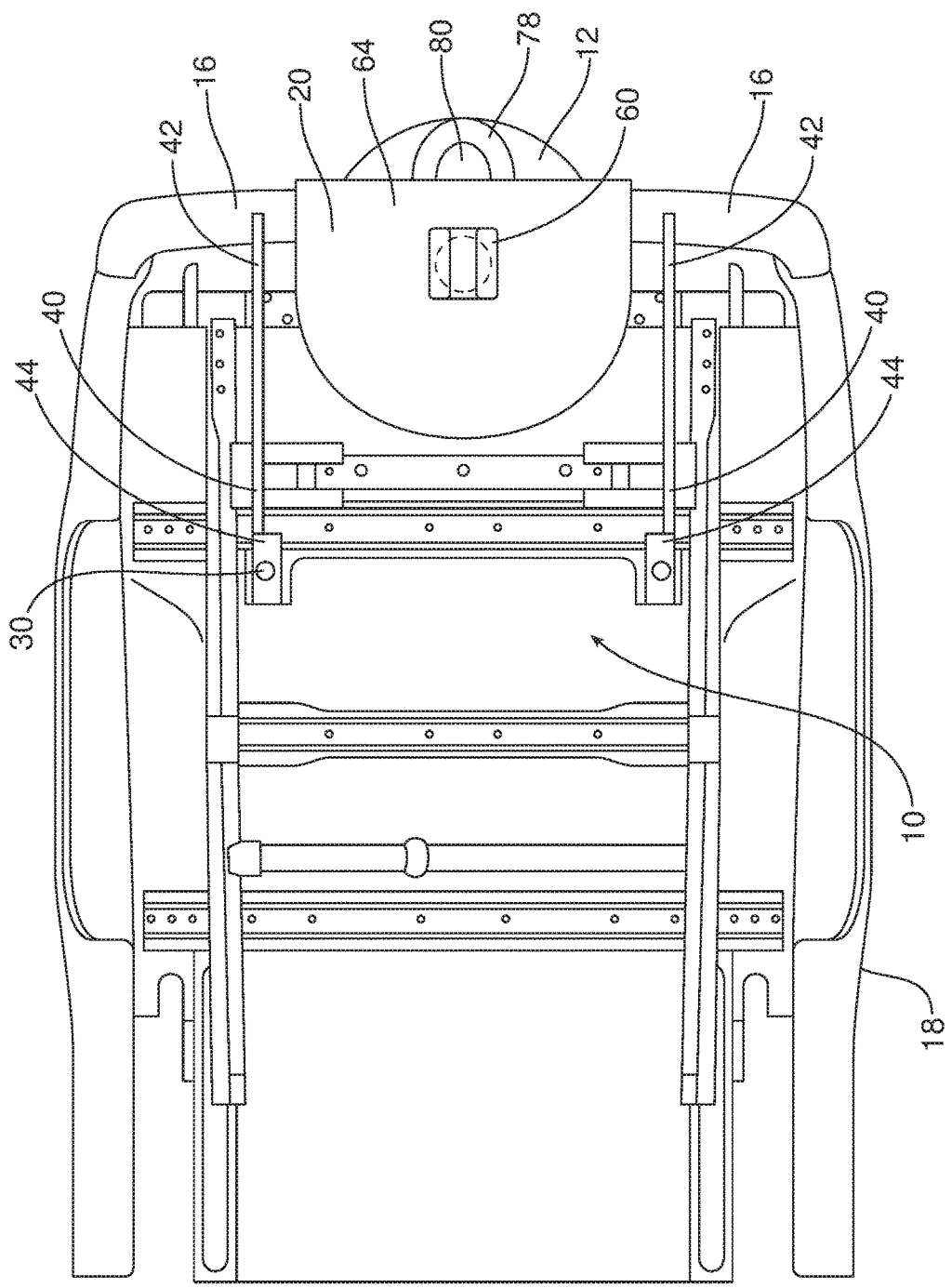

Reference is now made to FIGS. 1-10b illustrating the spare tire release device 10 that may be used to more easily maneuver and access a spare tire and wheel 12 that is stowed underneath the cargo bed 14 and behind the rear bumper 16 of the illustrated pickup truck 18. More specifically, the spare tire and wheel 12 are received and held in a wheel cradle 20. As will become apparent from the following description, that wheel cradle 20 is displaced between a stowed position, under the cargo bed 14 behind the rear bumper 16 as illustrated in FIGS. 1-1b, to a partially deployed position lowered below the rear bumper as illustrated in FIGS. 2-2b by means of a first slider mechanism generally designated by reference numeral 22 (see also FIGS. 5a-5c, 6-6b and 7-7b). The wheel cradle 20 and the spare tire and wheel 12 held therein may then be displaced from the partially deployed position illustrated in FIGS. 2-2b to the fully deployed position illustrated in FIGS. 3-3b by means of a second slider mechanism generally designated by reference numeral 24 (see also FIGS. 5a-5c, 8-8a, 9-9b and 10-10b).

As should be appreciated, the first slider mechanism 22 is generally oriented in a direction which is vertical in the illustrated embodiment while the second slider mechanism 24 is generally oriented in a second direction which is horizontal in the illustrated embodiment. As best illustrated in FIGS. 1-3b, 5a and 6-6b, the first slider mechanism 22 includes a first guide 26 in the form of two tubes that are fixed to the body of the motor vehicle by means of connection to the cross-car beam 28. A first slide member 30 slides along the first guide 26. As best illustrated in FIGS. 1-3b, 5a and 7-7b, the first slide member 30 of the illustrated embodiment includes two rods that are telescopically received in the first guide tubes 26.

As illustrated in FIGS. 6-6b, the first guide tubes 26 include two opposed stops 32 at a first end 34. As best illustrated in FIGS. 7-7b, the first slide member 30 includes a first opposed set of channels 36 closed at a first end 38 of each rod. The slide members 30 are oriented with the stops 32 down while the first slide member 30 is oriented with the closed ends 38 of the channels 36 up so that the first closed ends 38 of the slide members/rods engage the stops 32 when the wheel cradle 20 is lowered from the stowed position to the partially deployed position illustrated in FIGS. 2-2b.

As best illustrated in FIGS. 1-3b, 5a, 5b, 8 and 8a, the second slider mechanism 24 includes a second guide 40 which comprises two tubes in the illustrated embodiment. One of those tubes 40 is illustrated in detail in FIGS. 9-9b. The second slider mechanism 24 also includes a second slide member 42. In the illustrated embodiment the second slide member 42 comprises two identical rods of the type illustrated in FIGS. 10-10b. The second guide tubes 40 are connected to the first slide member 30 and this assembled structure comprises a support carriage 44 for the wheel cradle 20. The slide member 42 is secured to the wheel cradle 20. A slot 41 provided along the insides of the second guide tubes 40 allows for that connection. Those slots 41 are closed at their forward ends.

In the illustrated embodiment, the second slide member 42 is telescopingly received within the second guide tubes 40. As shown in FIG. 9, each of the second guide tubes 40 includes a second stop 46 at the rear end. As illustrated in FIGS. 10-10b, each of the second slide member rods 42 includes a second channel 48 having a closed second end 50 that is oriented forward of the open end 52. When the wheel cradle 20 is displaced rearwardly from the partially deployed position illustrated in FIGS. 2-2b to the fully deployed position illustrated in FIGS. 3-3b, the stops 46 in the second guide tubes 40 engage the closed ends 50 of the second channels 48 in the second slide member rods 42.

Figure 4:
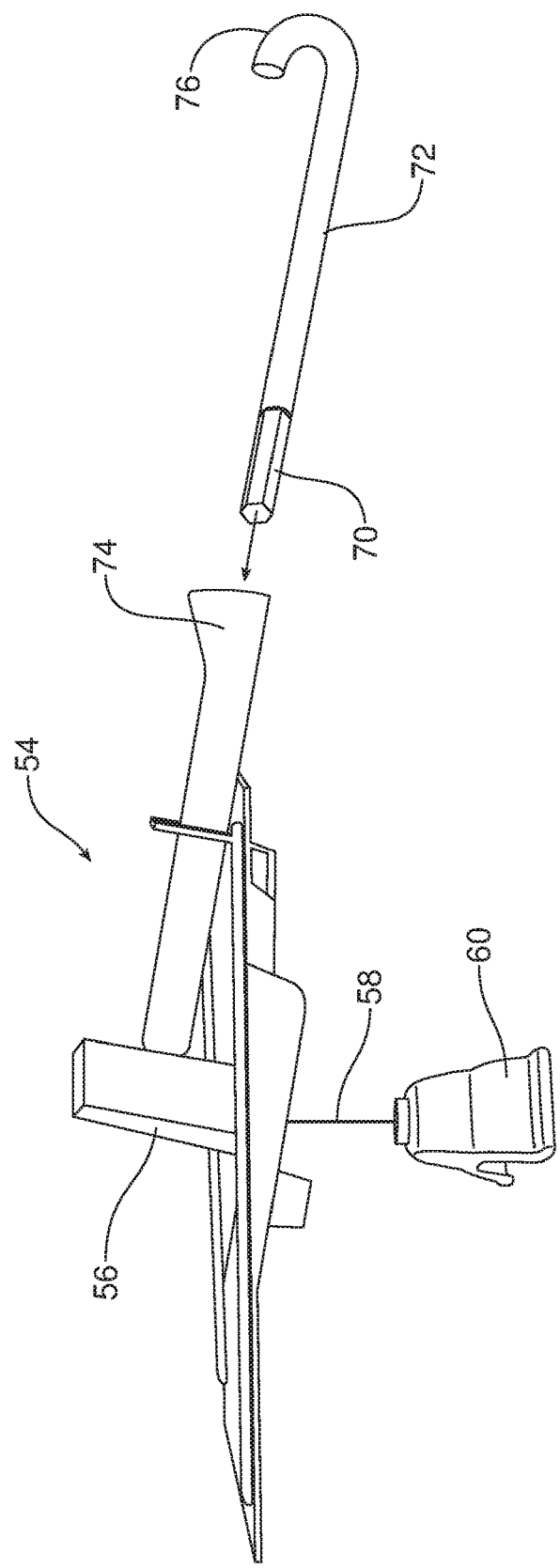
FIG. 4 is a partially schematic, detailed view illustrating the pulley system utilized to lower the wheel cradle from the stowed position to the partially deployed position.
Figure 5B:
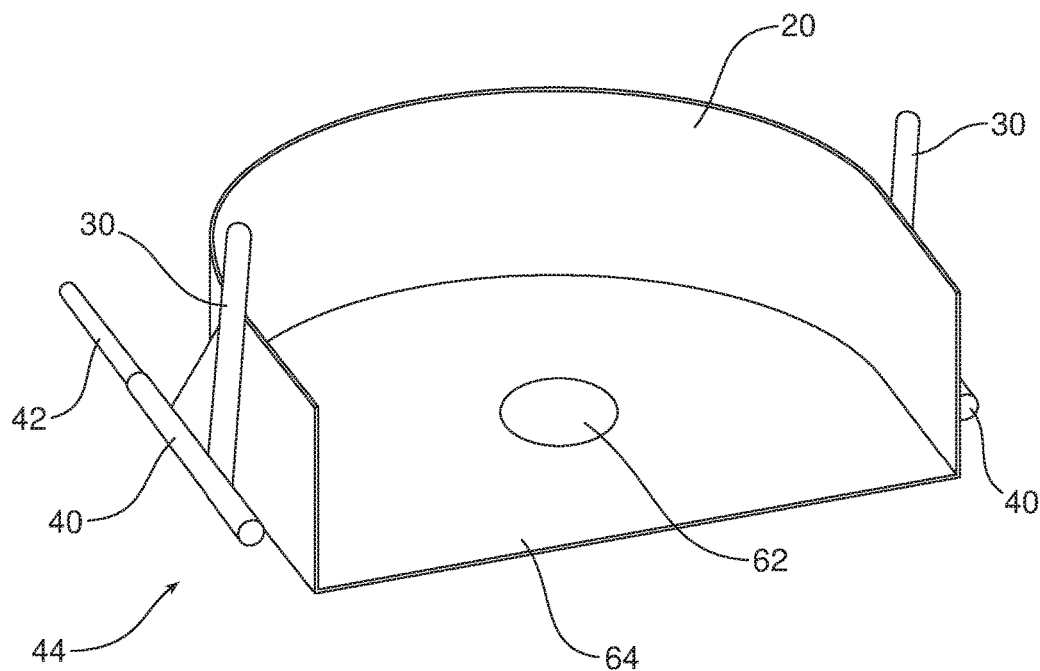
FIG. 5b is a detailed perspective view of the wheel cradle.
Figure 5C:
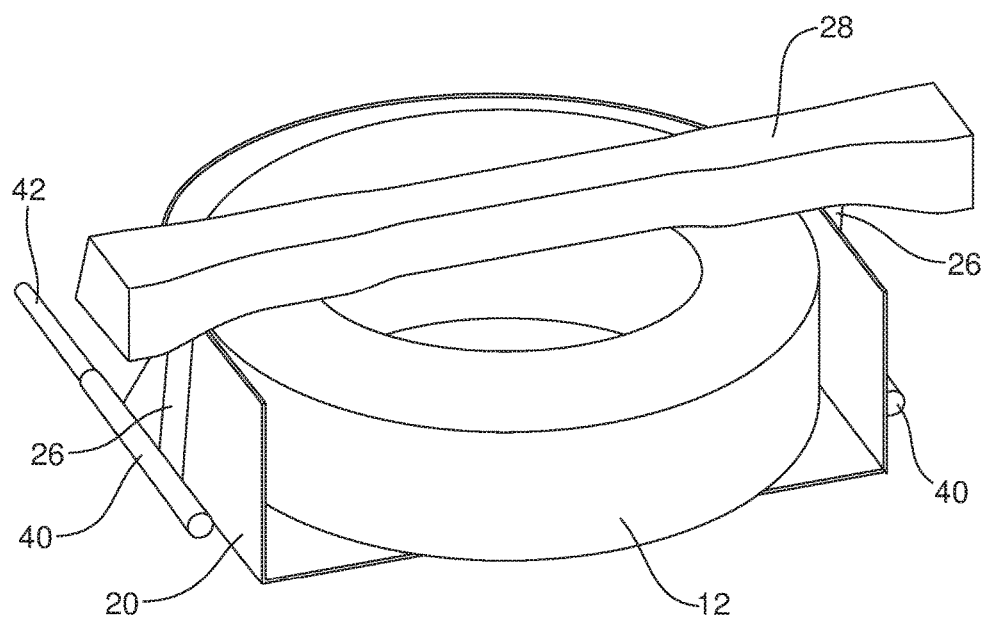
FIG. 5c is a detailed perspective view of the wheel cradle and the overlying cross car beam from which the wheel cradle is supported.

Reference is now made to FIG. 4 which schematically illustrates the pulley mechanism 54 for lowering and raising the wheel cradle 20 on the first slider mechanism 22 between the stowed position illustrated in FIGS. 1-1b and the partially deployed position illustrated in FIGS. 2-2b. That pulley mechanism 54 includes a pulley 56 fixed to the cross-car beam 28. A line 58 is wound on the pulley. A hanger 60 is attached to the distal end of that line 58. That hanger 60 is received in an aperture 62 in the bottom wall 64 of the wheel cradle 20 (see FIGS. 5a and 5b).

When one wishes to access the spare tire and wheel 12, such as when changing a flat tire on the pickup truck 18, one inserts the straight end 70 of the wrench 72 into the pulley drive receiver 74 and then rotates the curved end 76 of the wrench to payout the line 58 from the pulley 56. As this is done, the weight of the spare tire and wheel 12 and the wheel cradle 20 cause the first slide member tubes 30 to extend out of the first guide tubes 26 until the closed ends 38 of the channels 36 in the first slide member tubes 30 engage the stops 32 of the first guide tubes 26 upon reaching the partially deployed position illustrated in FIGS. 2-2b.

After lowering the wheel cradle 20 from the stowed position behind the bumper to the partially deployed position lower than the bumper, one displaces the wheel cradle 20 rearwardly so that at least a portion of the wheel cradle is below the bumper 16 and preferably, displaces the wheel cradle rearwardly until at least a portion of the wheel cradle and/or the spare tire and wheel 12 held therein projects rearwardly beyond the rear bumper 16 so as to be easy to access. This may be done by using the curved end 76 of the wrench 72 to engage a handle 78 that is secured to the wheel cradle 20 (see FIG. 3b). More specifically, as illustrated, the handle 78 is oriented rearward toward the rear bumper 16 and an opening 80 is provided between the handle 78 and the bottom wall 64 of the wheel cradle 20. The curved end 76 of the wrench 72 is positioned within this opening 80 so that the operator may pull or displace the wheel cradle 20 in a horizontal and rearward direction by means of the second slider mechanism 24 thereby moving the wheel cradle from the partially deployed position illustrated in FIGS. 2-2b to the fully deployed position illustrated in FIGS. 3-3b.

In this position, the user may easily access the spare tire and wheel 12 which is removed from the wheel cradle 20 to allow the changing of the flat tire.

As should be appreciated, one does not need to climb under or even reach under the pickup truck 18 in order to access the spare tire and wheel 12. One easily and conveniently lowers the wheel cradle 20 with the spare tire and wheel 12 by engaging the wrench 72 in the receiver 74 and rotating the pulley 56. One then reaches under the vehicle with the wrench 72 and engages the curved end 76 in the opening 80 formed by the handle 78 and then uses the wrench to pull against the handle 78 and displace the wheel cradle 20 rearwardly where it may be easily accessed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spare tire release device for a motor vehicle, comprising:
   a wheel cradle;
   a first slider mechanism to displace said wheel cradle in a first direction, wherein said first slider mechanism includes a first guide fixed to a body of said motor vehicle and a first slide member that slides along said first guide;
   a second slider mechanism to displace said wheel cradle in a second direction whereby said wheel cradle may be maneuvered for easy access, wherein said second slider mechanism includes a second guide fixed to said first slide member and a second slide member fixed to said wheel cradle wherein said second slide member slides along said second guide, and wherein said second guide and said second slide member are telescoping; and
   a pulley mechanism for displacing said wheel cradle in said first direction between a stowed position and a partially deployed position.

2. The spare tire release device of claim 1, wherein said first slide member and said second guide comprise a support carriage for said wheel cradle.

3. The spare tire release device of claim 2, wherein said pulley mechanism includes a pulley carried on said body of said motor vehicle.

4. The spare tire release device of claim 3, wherein said pulley mechanism further includes a line wound on said pulley and a hanger attached to a distal end of said line.

5. The spare tire release mechanism of claim 4, wherein said wheel cradle is supported by said hanger.

6. The spare tire release mechanism of claim 5, wherein said first guide and said first slide member are telescoping.

7. A motor vehicle incorporating the spare tire release device set forth in claim 1.

8. A spare tire release device for a motor vehicle, comprising:
   a wheel cradle;
   a first slider mechanism to displace said wheel cradle in a first direction, wherein said first slider mechanism includes a first guide fixed to a body of said motor vehicle and a first slide member that slides along said first guide, wherein said first guide includes a first stop and said first slide member includes a first channel closed at a first end wherein said first end engages said first stop when said wheel cradle is in a partially deployed position; and
   a second slider mechanism to displace said wheel cradle in a second direction whereby said wheel cradle may be maneuvered for easy access, wherein said second slider mechanism includes a second guide fixed to said first slide member and a second slide member fixed to said wheel cradle wherein said second slide member slides along said second guide, and wherein said second guide and said second slide member are telescoping.

9. The spare tire release mechanism of claim 8, wherein said second guide includes a second stop and said second slide member includes a second channel closed at a second end wherein said second end engages said second stop when said wheel cradle is in a fully deployed position.

10. The spare tire release device of claim 9, further including a spare tire on a wheel held in said wheel cradle.

11. The spare tire release device of claim 10, further including a handle on said wheel cradle.

* * * * *